US009396433B2

(12) United States Patent
Subramaniam et al.

(10) Patent No.: US 9,396,433 B2
(45) Date of Patent: Jul. 19, 2016

(54) DETERMINING RELATED DATA POINTS FROM MULTI-MODAL INPUTS

(71) Applicant: International Business Machines Corporation, Armonk, NY (US)

(72) Inventors: L. Venkata Subramaniam, New Delhi (IN); Sameep Mehta, New Delhi (IN); Raghuram Krishnapuram, Bangalore (IN); Tanveer A. Faruquie, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 13/904,489

(22) Filed: May 29, 2013

(65) Prior Publication Data

US 2014/0358843 A1    Dec. 4, 2014

(51) Int. Cl.
  *G06F 15/00*   (2006.01)
  *G06F 15/18*   (2006.01)
  *G06N 5/02*    (2006.01)

(52) U.S. Cl.
  CPC ...................................... *G06N 5/02* (2013.01)

(58) Field of Classification Search
  CPC ... H04L 12/5865; H04L 12/588; H04L 51/32; B25J 9/08; B25J 9/1633; B25J 9/1694; B25J 9/1697; G06F 15/00; G06F 15/18
  USPC .......................................................... 706/58
  See application file for complete search history.

(56) References Cited

U.S. PATENT DOCUMENTS

| 8,396,282 B1 | 3/2013 | Huber et al. | |
| 2006/0074290 A1 | 4/2006 | Chen et al. | |
| 2006/0149461 A1* | 7/2006 | Rowley et al. | 701/202 |
| 2008/0077386 A1* | 3/2008 | Gao et al. | 704/3 |
| 2008/0109162 A1* | 5/2008 | Chen et al. | 701/210 |
| 2009/0307772 A1 | 12/2009 | Markham et al. | |
| 2011/0035098 A1* | 2/2011 | Goto et al. | 701/36 |
| 2011/0076994 A1* | 3/2011 | Kim et al. | 455/414.2 |
| 2012/0042022 A1* | 2/2012 | Sheth | H04L 51/32 709/206 |
| 2012/0078508 A1* | 3/2012 | Ellanti et al. | 701/419 |

FOREIGN PATENT DOCUMENTS

| CN | 102289430 | 12/2011 |
| CN | 102881162 | 1/2013 |

OTHER PUBLICATIONS

Khalidov et al., Conjugate Mixture Models for Clustering Multimodal Data, Neural Computation, vol. 23, No. 2, pp. 517-557, Feb. 2011.
Signer et al., Mudra—A Unified Multimodal Interaction Framework, Proceedings of the 13th International Conference on Multimodal Interaction (ICMI 2011), Alicante, Spain, Nov. 2011, pp. 1-8.
Wikipedia. Allen's Interval Algebra. http://en.wikipedia.org/wiki/Allen's_interval_algebra Mar. 16, 2013.

* cited by examiner

*Primary Examiner* — Kakali Chaki
*Assistant Examiner* — Peter Coughlan
(74) *Attorney, Agent, or Firm* — Ryan, Mason & Lewis, LLP

(57) ABSTRACT

Techniques, systems, and articles of manufacture for determining related data points from multi-modal inputs. A method includes collecting multiple items of multi-modal data comprising at least one dimension from multiple data sources, wherein said at least one dimension comprises a geographic dimension, a temporal dimension and/or an event-related dimension, determining a window of relevance for each of the multiple items of multi-modal data with respect to the at least one dimension, and identifying two or more of the multiple items of multi-modal data as related, by determining an overlap of the window of relevance corresponding to each of the two or more items of multi-modal data with respect to the at least one dimension.

19 Claims, 6 Drawing Sheets

DETERMINING RELATED DATA POINTS FROM MULTI-MODAL INPUTS

FIELD OF THE INVENTION

Embodiments of the invention generally relate to information technology, and, more particularly, to data analysis techniques.

BACKGROUND

Analyzing structured databases can include the use of predicates. For example, predicates representing the different states in which any two intervals can exist include "overlaps," "overlapped by," "contains," "contained by," "equals," "starts," "started by," "finishes," "finished by," "meets," "met by," "before" and "after." However, use of such predicates in existing database analysis approaches limits analysis to the time dimension, and such approaches also do not include determining equivalence among multi-modal and/or multi-source data sources.

Accordingly, a need exists for determining related data points from multi-modal and/or multi-stream inputs.

SUMMARY

In one aspect of the present invention, techniques for determining related data points from multi-modal inputs are provided. An exemplary computer-implemented method can include steps of collecting multiple items of multi-modal data comprising at least one dimension from multiple data sources, wherein said at least one dimension comprises a geographic dimension, a temporal dimension and/or an event-related dimension, determining a window of relevance for each of the multiple items of multi-modal data with respect to the at least one dimension, and identifying two or more of the multiple items of multi-modal data as related, by determining an overlap of the window of relevance corresponding to each of the two or more items of multi-modal data with respect to the at least one dimension.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
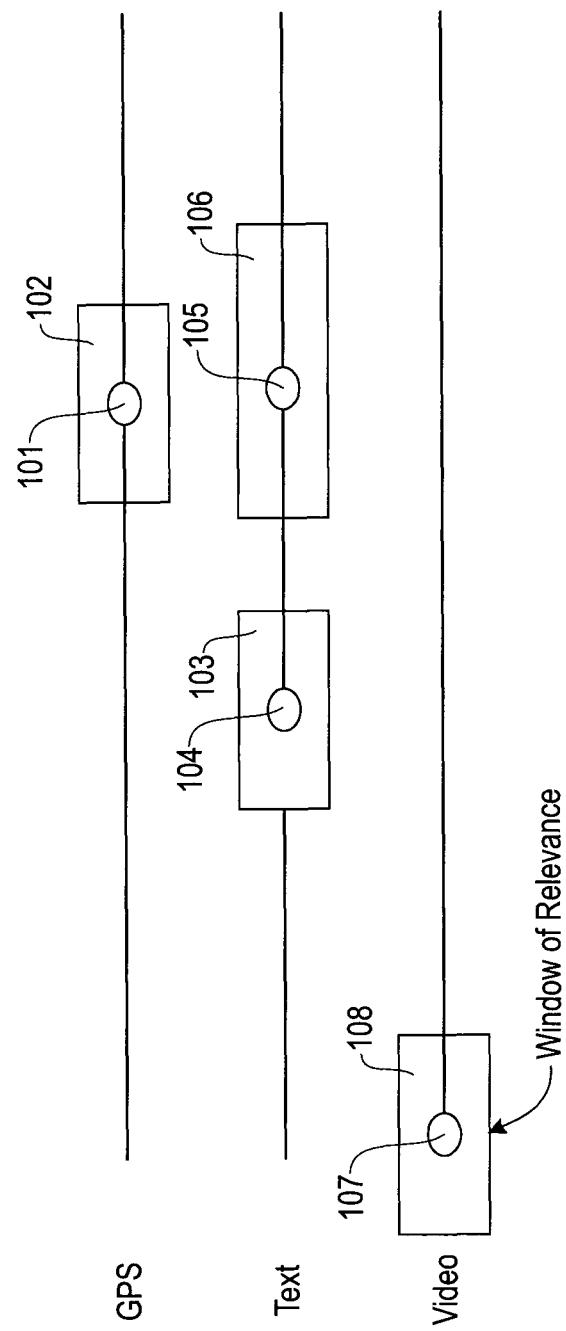
FIG. 1 is a diagram illustrating temporal equivalence, according to an embodiment of the invention.

As described herein, an aspect of the present invention includes techniques for determining related data points from multi-modal and/or multi-stream inputs. At least one embodiment of the invention includes collecting and joining contextual data from multiple data points in a selected region (for example, a city), wherein such contextual data can include multi-modal data from different periods of time, different spatial locations within the selected region, and/or data captured via different semantics. Additionally, each item of data can have an individual relevance score associated with a topic of interest.

At least one embodiment of the invention can include utilizing crowd-sourcing or crowd-sensing to collect or capture data. Additionally, a variety of data can be considered or incorporated in connection with at least one embodiment of the invention. By way of example, crowd-sourced data can include text message data, speech data, global positioning system (GPS) data, ambient audio data, mobile call detail records (CDRs), internet content derived from sources such as social networks, blogs, online news sites, etc., as well as mobile-specific content derived from sources such as smartphone applications, voice calls, text messages, etc.

Crowd-sourcing can be implemented, by way of example, via physical crowd sensors such as mobile network CDRs, GPS sensors, audio sensors, traffic sensors, etc. Such data, accordingly, can include multi-modal, ambiguous, partial, inaccurate and/or potentially noisy data. Consequently, as detailed herein, at least one embodiment of the invention includes performing one or more analytics functions on such data and fusing the data so as to enable generation of alerts, actions, reports, etc., as appropriate.

Accordingly, at least one embodiment of the invention includes determining the N-dimensional equivalence of data points for performing joins of multi-modal data sources. Additionally, in joining data points by determining equivalence in N-dimensional space, the N-dimensions can include, for example, time, space, semantics, and relevance. As further described herein, at least one embodiment of the invention can also include determining semantic equivalence between multi-modal and/or multi-stream data points, as well as determining a window of relevance for a given data point for a specific topic and/or dimension.

Determining events using multi-modal data can include, for example, extracting events and measures from raw crowd-sourcing or crowd-sensing data. Such events might include, merely by way of example, water events such as floods, and water management events pertaining to water leakages, water quality issues, etc. Such events may also include transportation events such as traffic, accidents, and road conditions issues. Additionally, events can include public safety events such as, for example, a fire-related event and/or a police- or crime-related event.

As used herein, equivalence refers to two or more items of data that can be joined due to an overlapping window of relevance for the two or more items of data. Determining a window of relevance can include the following. Based on domain knowledge, an expert can define a window of relevance along each of one or more dimensions. Also, a window of relevance can be automatically determined using labeled historical data. Accordingly, consider the following examples of windows of relevance defined along multiple dimensions. For instance, citizen alerts regarding a current traffic situation may be valid for a pre-specified number of minutes. Additionally, the same traffic alert may have a specified geographical area of influence and/or relevance (for example, a two-mile radius of roads surrounding a traffic site). Further, an event such as a sporting event may have a high relevance score associated with certain parts of a geographic area, but may have lesser influence (or a lower relevance score) associated with other parts of the geographic area. Similarly, certain events may be correlated to one another, such as, for example, a public concert and traffic issues.

FIG. 1 is a diagram illustrating temporal equivalence, according to an embodiment of the present invention. By way of illustration, FIG. 1 depicts an item of GPS data 101 (with a corresponding window of relevance 102), items of text message data 103 and 105 (with corresponding windows of relevance 104 and 106, respectively), and an item of video data 107 (with a corresponding window of relevance 108). For example, the GPS data item 101 might include coordinates (for example, 12.58456 N, 77.38453 E) indicating a trajectory of a city bus moving through city roads, as well as a time-stamp (for example, 12:35 PM) associated with those identified coordinates. Also, the items of text message data 103 and 105 can originate from a geographic location similar to the noted GPS data coordinates, and can include time-stamps of 9:15 AM and 12:46 PM, respectively, with the latter item of text message data (105) including a message that reads: "There is a traffic jam here." Further, the item of video data 107 can include a traffic video of an intersection at a geographic location similar to the noted GPS data coordinates, along with a time-stamp of 5:00 AM.

Given such example items of data as described above, the GPS data item 101 and the latter item of text message data 105 demonstrate a temporal equivalence given the overlapping window of relevance for these two items of data. Accordingly, given that the GPS time stamp for data item 101 is 12:35 PM, it can be determined from past experience and/or historical data that the same traffic state may last for the next 20 minutes. As such, in this case, the window of relevance 102 spans from 12:35 PM to 12:55 PM. Similarly, the text message data item 105 having the time stamp of 12:46 PM also indicates a traffic event, and from past experience and/or historical data, it can be determined that the traffic state will last for 20 minutes. Accordingly, the window of relevance 106 spans from 12:46 PM to 13:06 PM. As such, windows of relevance 102 and 106 overlap. The windows of relevance for traffic states may vary from location to location, and each can be determined from historical data and/or input from a domain expert. To determine a window of relevance from historical data, past traffic instances can be analyzed to determine the approximate duration of such traffic states.

Figure 2:
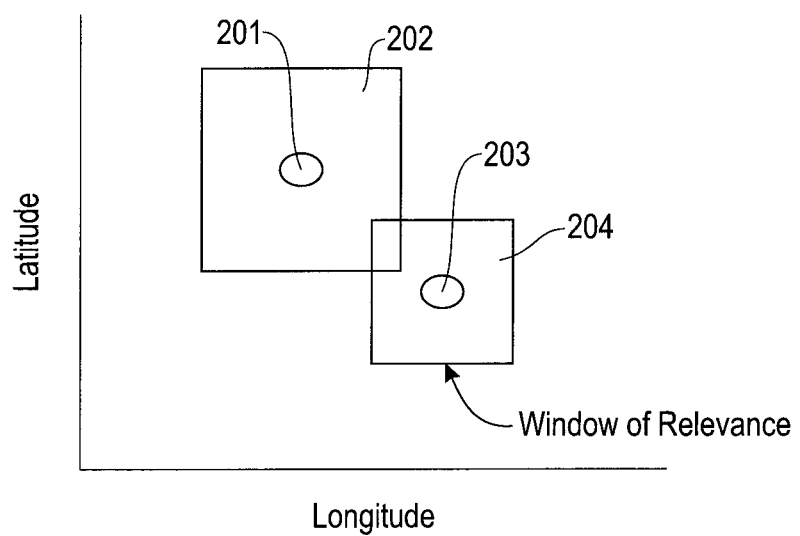
FIG. 2 is a diagram illustrating spatial equivalence, according to an embodiment of the invention.

FIG. 2 is a diagram illustrating spatial equivalence, according to an embodiment of the present invention. By way of illustration, FIG. 2 depicts items of data 201 (with a corresponding window of relevance 202) and 203 (with a corresponding window of relevance 204). Similar to the illustration of temporal equivalence in FIG. 1, the distance between location dimensions of data items 201 and 203 can be measured as metric spaces (such as, for example, measured in longitude and latitude values). Given such example items of data as depicted in FIG. 2, data items 201 and 203 demonstrate a spatial equivalence given the overlapping window of relevance for these two items of data. For example, with regards to such windows of relevance, when a traffic jam occurs at junction A, it can be determined from past instances and/or historical data that such an event also affects neighboring roads up to a two kilometer distance. By automatically learning such trends from past instances and/or historical data, the window of spatial relevance can be determined.

Figure 3:
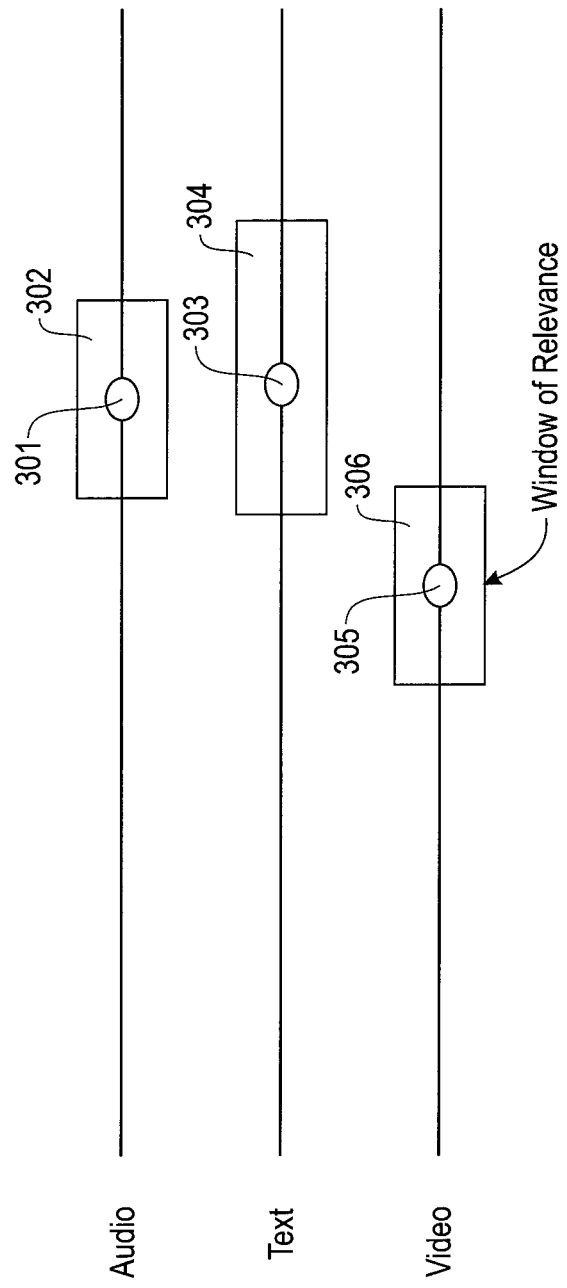
FIG. 3 is a diagram illustrating semantic equivalence, according to an embodiment of the invention.

FIG. 3 is a diagram illustrating semantic equivalence, according to an embodiment of the present invention. By way of illustration, FIG. 3 depicts an item of audio data 301 (with a corresponding window of relevance 302), an item of text message data 303 (with a corresponding window of relevance 304), and an item of video data 305 (with a corresponding window of relevance 306). By way of example, the item of audio data 301 can include ambient audio captured via a sensor, the item of text message data 303 can include a message that reads: "There is a traffic jam here," and the item of video data 305 can include a video feed from a traffic camera positioned at a relevant intersection.

In accordance with at least one embodiment of the invention, syntactic distance can be measured via one or more measures such as edit distance, phonetic distance, pre-fix matching, and/or abbreviation expansion. Such measures can include detecting a difference in the surface form of words (for example, before, bef, b4, etc.). Additionally, semantic distance can be measured based on how closely related two (or more) items of data are based on the words contained in and/or derived from the items of data. An example might include establishing relationships between words (for example, the similarity established between the words before, previous, front, preceding, etc.). In such an example, at least one embodiment of the invention can include creating a graph based on a thesaurus wherein the nodes are the words and edges indicate whether each word is listed as a synonym in the thesaurus. It is also possible that a path between certain words may include other words. In at least one embodiment of the invention, a shortest path algorithm provides the distance between nodes and represents a measure of semantic similarity.

In determining semantic and/or topical equivalence in, for example, two text spaces, it may be readily apparent that the content of the two spaces includes the same topic because each space contains one or more matching key words (for example, the phrase "traffic jam" being mentioned in both text spaces). In other instances, the content of two spaces may include the same topic but that fact may not be readily apparent. For example, a semantic relationship between the phrases "traffic jam" and "pile up" may need to be explicitly stated or otherwise automatically determined via at least one embodiment of the invention.

Accordingly, in such an instance, a semantic equivalence between multi-modal data points is determined. For example, given an item of data (an audio signal, a text message, a GPS reading, etc.), at least one embodiment of the invention includes determining an amount of semantic relevance that the audio signal has to a given topic (for example, traffic). As an example, for audio data, at least one embodiment of the invention can include building a classifier to determine whether there is traffic noise in the audio data. Another classifier can additionally be built to determine whether there is a human voice in the audio data. A traffic classifier is trained with instances of the targeted parameter (for example, traffic noise) to create a robust detector of said parameter. Additionally, a classifier can score a piece of data based on the amount of detected parameter (for example, how much traffic noise is in an item of audio data). For instance, audio collected from a traffic junction may have a high score for traffic and noise pollution while having a low score for human voices.

Measuring semantic and/or topical distance can include computing the relevance of different data points (for example, multi-modal data from multiple sources) in connection with a given topic. The data points are placed on a semantic scale wherein metric distances are applied, and the equivalence between two topics is measured based on the relevance distance therebetween. As an example, consider a scenario with audio data collected from a road junction, a text message collected from the same location, and a GPS trajectory from a bus in the same neighborhood. Assume, in this example, that a goal includes determining whether a traffic decision can be made using these pieces of data. Accordingly, in at least one embodiment of the invention, the items of data are passed through relevant classifiers to determine whether each item of data contains traffic information. Each classifier scores the data point for relevance to a given topic (such as traffic) and provides a margin score (that is a distance from the classifier boundary). The data modalities that generate a high score (for example, a score above a pre-determined threshold) for traffic are taken to be relevant.

Additionally, measuring the semantic distance of an audio data point from a given topic can include using binary margin classifiers for different topics (for example, traffic, noise pollution, crowd noise, etc.). Each classifier scores the data point for relevance to a given topic and provides a margin score that represents the distance of the data point from the classifier boundary. By way of example, audio data collected from a traffic junction may produce a high classifier score for traffic and noise pollution, and may produce a low classifier score for crowd noise.

In at least one embodiment of the invention, as noted, a binary margin classifier can be used to generate a margin score. A binary margin classifier works by creating a decision boundary between two classes of input data. As an example, the two classes for an audio clip can be "traffic sound" and "not a traffic sound." Examples of both traffic sounds and non-traffic sounds are learned by the classifier (for example, based on historical data), so that when a new audio clip is provided, the classifier is able to classify the audio clip as containing a traffic sound or not. A binary margin classifier also provides the distance of each data point from a decision boundary. As such, the margin classifier generates a class decision and a distance from a boundary for the data point.

Measuring the semantic distance of a text data point from a given topic can similarly include using binary margin classifiers for different topics. As with audio data detailed above, each classifier scores the text data point for relevance to a given topic and provides a margin score that represents the distance of the data point from the classifier boundary.

As also noted herein, at least one embodiment of the invention includes determining N-dimensional equivalence. Such techniques can include considerations of primary dimensions as well as secondary dimensions. With respect to primary dimensions, two (or more) data points are candidates for a join if the data points overlap in N-dimensional equivalence space for (i) temporal equivalence, (ii) spatial equivalence, and/or (iii) topical and/or semantic equivalence. At least one embodiment of the invention additionally includes utilizing secondary dimensions that are dependent on one or more primary dimensions. Such secondary dimensions can include, for example, a veracity score, and a relevance score and/or weight.

Further, at least one embodiment of the invention includes joining multi-stream data. As detailed herein, two data points are candidates for a join if the data points overlap in N-dimensional equivalence space. Additionally, each item of data can be tagged and/or annotated with information including corresponding time, location, semantic relevance, veracity, relevance, weight, etc. One or more of these annotations are available in the form of metadata along with the corresponding item of data. Information such as semantic relevance for each topic is computed by passing the item of data through a binary margin classifier, as described above. Veracity values can be assigned, for example, based on rules pertaining to identity of the originator of the data point, wherein trusted sources are assigned a higher veracity score than are untrusted sources. Relevance and weight can be assigned, for example, based on rules pertaining to the past utility associated with the modality or data stream corresponding to the given item of data.

Figure 4:
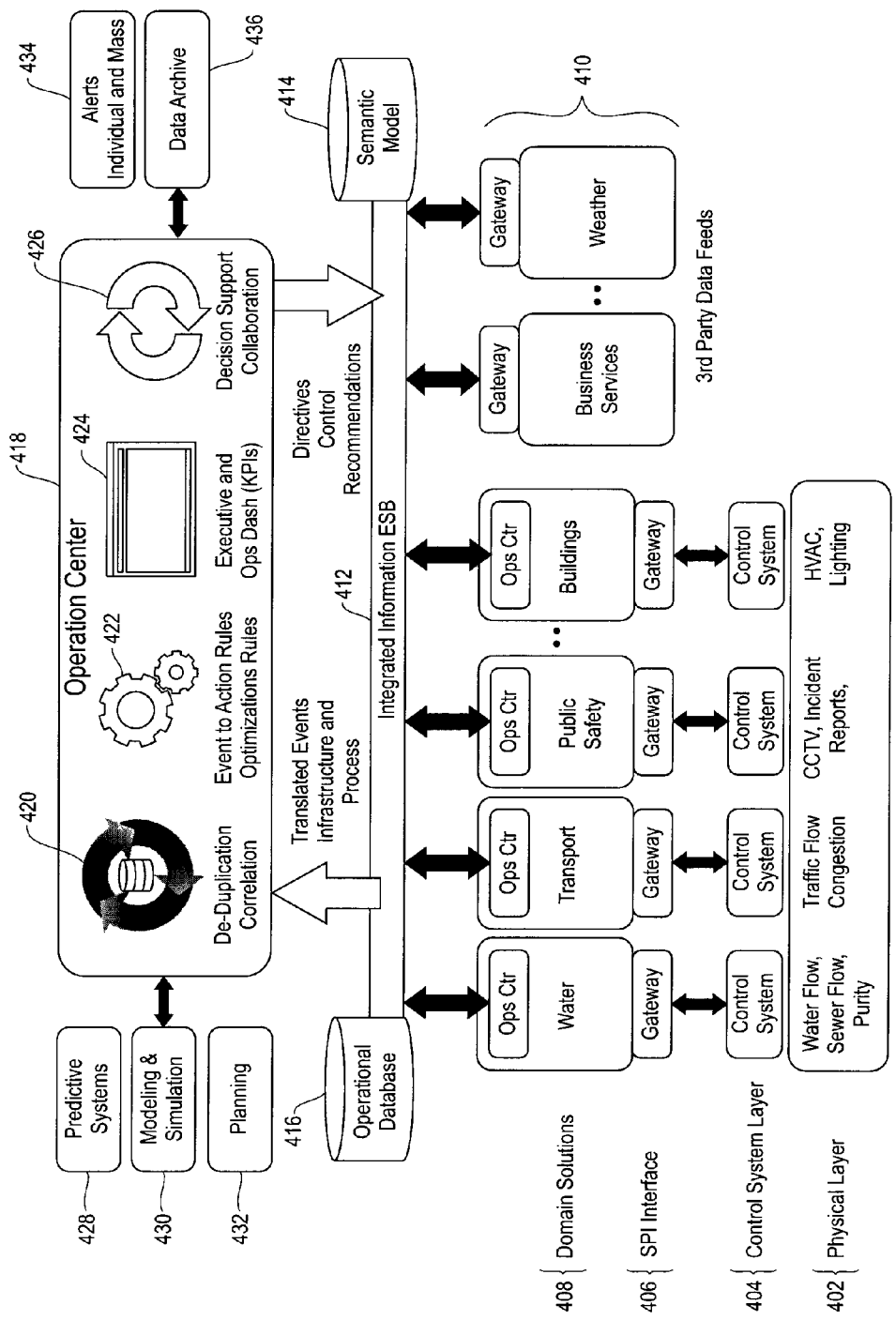
FIG. 4 is a block diagram illustrating an example embodiment, according to an aspect of the invention.

FIG. 4 is a block diagram illustrating an example embodiment, according to an aspect of the invention. By way of illustration, FIG. 4 depicts components utilized in collecting and/or uploading crowd-sourced data. Such components include a physical layer 402 (for information such as water-related information, traffic information, public safety information and structural information), a control system layer 404, a serial peripheral interface (SPI) layer 406 including gateways between the control system layer 404 and a domain solutions layer 408. The domain solutions layer 408 can include sub-components for water information, transportation information, public safety information, building information, etc., with each sub-component also containing an operations center module.

FIG. 4 also depicts an integrated information enterprise service bus (ESB) 412, which receives input from the components utilized in collecting and/or uploading crowd-sourced data. The ESB 412 also stores data in an operational database 416 as well as generates and stores data models such as semantic model database 414, which can include interacting with third party data feeds 410 (incorporating information such as business services, weather, etc.). The ESB translates the uploaded crowd-sourced data into events and provides the identification of said events to an operation center 418. The operation center 418 includes a de-duplication correlation component 420, an event-to-action rules optimization rules component 422, an executive and operations dashboard (including key performance indicators (KPIs)) 424 and a decision support collaboration component 426. The operation center 418, as also illustrated in FIG. 4, additionally provides directives and/or control recommendations to the ESB 412.

Further, the operation center 418 interacts with additional components including a predictive system 428, a modeling and simulation component 430 and a planning component 432. Based on the noted input and interactions, the operation center 418 joins data, performs predictive analytics, creates corresponding reports, and also generates alerts and corresponding actions in accordance with the crowd-sourced data.

More specifically, the physical layer 402 includes various modalities used to collect information, which can include both device and human sensors. The physical layer 402 collects information pertaining to the environment and surroundings based on which decisions are made in the operation center 418. These decisions can serve as inputs that can be domain specific. For example, some decisions can pertain to public safety, while other decisions can pertain to transportation. Further, the different items of information coming into the system can be combined based on relevance. For example, citizens may have reported a traffic jam at location B at time t, and a sensor may have observed a traffic condition at location C at time t+T. In such a case, at least one embodiment of the invention includes determining whether these two events are related based on the difference in both time and distance. Once all related events have been identified, at least one embodiment of the invention includes fusing such events in the information integration layer 412. The fused information can be presented to the operation center 418 for decision making.

Figure 5:
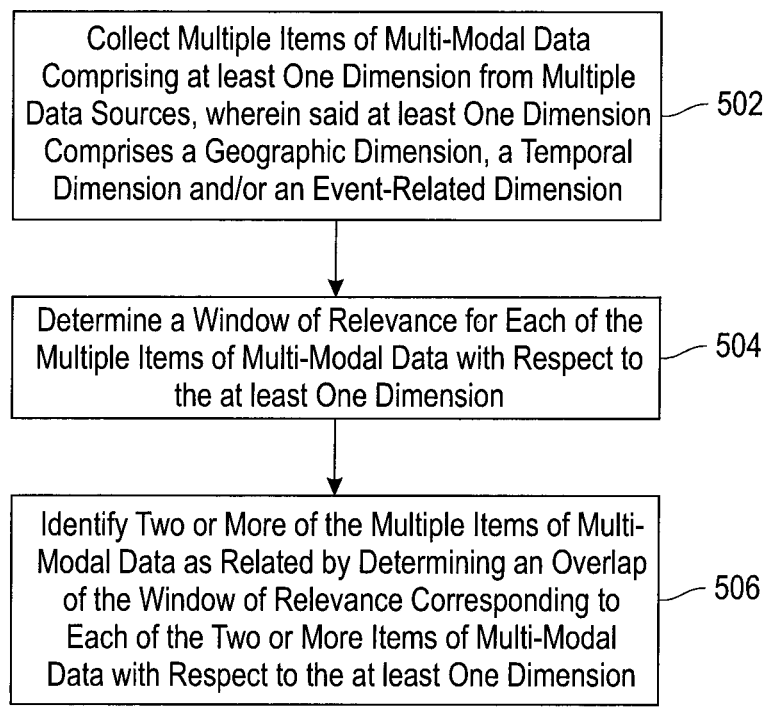
FIG. 5 is a flow diagram illustrating techniques according to an embodiment of the invention.

FIG. 5 is a flow diagram illustrating techniques according to an embodiment of the present invention. Step 502 includes collecting multiple items of multi-modal data comprising at least one dimension from multiple data sources, wherein said at least one dimension comprises a geographic dimension, a temporal dimension and/or an event-related dimension. The collecting can also include collecting multiple items of multi-modal data from multiple data sources over two or more periods of time, as well as from two or more spatial locations within the geographic region. Additionally, multi-modal data can include text message data, speech data, global positioning system data, audio data, mobile call detail records, internet content, and/or mobile-specific content. Further, as detailed herein, collecting the data can include collecting multiple items of multi-modal data via one or more physical sensors such as, for example, mobile network mobile call detail records, global positioning system sensors, audio sensors, and/or traffic sensors.

Step 504 includes determining a window of relevance for each of the multiple items of multi-modal data with respect to the at least one dimension. The said determining step can include manually defining the window of relevance with respect to the at least one dimension based on domain knowledge, and/or automatically determining the window of relevance using labeled historical data associated with the at least one dimension. Additionally, as detailed herein, dimensions can include a time dimension, a location dimension, a semantics dimension, and/or a relevance dimension.

Step 506 includes identifying two or more of the multiple items of multi-modal data as related, by determining an overlap of the window of relevance corresponding to each of the two or more items of multi-modal data with respect to the at least one dimension. Determining an overlap of the window of relevance corresponding to items of multi-modal data with respect to the at least one dimension can include determining a physical distance between each of the items of multi-modal data, and/or determining a syntactic distance between each of the items of multi-modal data. Determining the syntactic distance can include measuring the syntactic distance via an edit distance measure, a phonetic distance measure, a pre-fix matching measure, and/or an abbreviation expansion measure.

Additionally, determining an overlap of the window of relevance corresponding to each of the items of multi-modal can include determining a semantic distance between each of the two or more items of multi-modal data. This can include, for example, measuring the semantic distance based a relatedness of words contained and/or derived from the items of multi-modal data.

The techniques depicted in FIG. 5 can also include annotating each of the multiple items of collected multi-modal data with information such as a time corresponding to said collection, location, a semantic relevance to a given topic of interest, a veracity score associated with the source of the item of data, a weight, and/or a relevance score associated with a topic of interest. Additionally, at least one embodiment of the invention includes storing the identification of the two or more of the multiple items of multi-modal data as related with respect to the at least one dimension.

Additionally, at least one embodiment of the invention includes collecting multiple items of multi-modal data comprising multiple dimensions from multiple data sources, wherein said multiple dimensions comprise a geographic dimension, a temporal dimension and an event-related dimension. Such an embodiment can also include determining a window of relevance for each of the multiple items of multi-modal data with respect to each of the multiple dimensions, identifying two or more of the multiple items of multi-modal data as related by determining an overlap of the window of relevance corresponding to each of the two or more items of multi-modal data with respect to at least two of the multiple dimensions, and generating an alert based on the content of the two or more related items of multi-modal data.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 6:
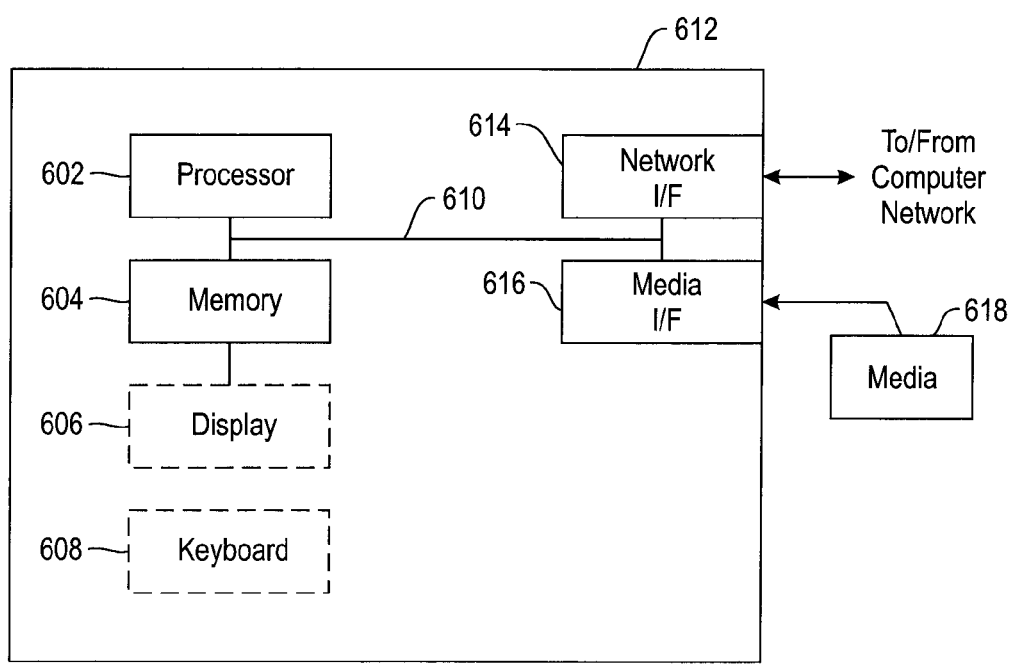
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, determining the N-dimensional equivalence of data points for performing joins of multi-modal data sources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    collecting multiple items of multi-modal data comprising a plurality of dimensions from multiple data stream originators, wherein said plurality of dimensions comprises at least a geographic dimension, a temporal dimension and an event-related dimension;
    annotating each of the multiple items of collected multi-modal data with information, wherein the information comprises at least a veracity score associated with the data stream originator of the item of data;
    determining multiple windows of relevance for the multiple items of multi-modal data with respect to the plurality of dimensions, wherein said multiple windows of relevance comprise at least (i) a temporal window of relevance, (ii) a spatial window of relevance, and (iii) and a semantic window of relevance; and
    identifying two or more of the multiple items of multi-modal data as related based on said veracity score associated with the data stream originator of each item of data and by determining an overlap of at least one of the multiple windows of relevance corresponding to each of the two or more items of multi-modal data with respect to at least one of the plurality of dimensions;
    wherein said collecting, said annotating, said determining, and said identifying are carried out by a computer device.

2. The method of claim 1, wherein said collecting comprises collecting multiple items of multi-modal data from multiple data stream originators over two or more periods of time.

3. The method of claim 1, wherein said collecting comprises collecting multiple items of multi-modal data from multiple data stream originators corresponding to two or more spatial locations within the geographic region.

4. The method of claim 1, wherein said multi-modal data comprises text message data, speech data, global positioning system data, audio data, mobile call detail records, internet content, and/or mobile-specific content.

5. The method of claim 1, wherein said collecting comprises collecting multiple items of multi-modal data via one or more physical sensors.

6. The method of claim 5, wherein the one or more physical sensors comprise mobile network mobile call detail records, global positioning system sensors, audio sensors, and/or traffic sensors.

7. The method of claim 1, wherein said information further comprises a time corresponding to said collection, a location corresponding to said collection, a semantic relevance to a given topic, a weight, and/or a relevance score associated with a given topic.

8. The method of claim 1, wherein said determining multiple windows of relevance comprises manually defining each respective one of the multiple windows of relevance with respect to at least a respective one of the plurality of dimensions based on domain knowledge.

9. The method of claim 1, wherein said determining multiple windows of relevance comprises automatically determining the multiple windows of relevance using labeled historical data associated with at least a respective one of the plurality of dimensions.

10. The method of claim 1, wherein said determining an overlap of the window of relevance corresponding to each of the two or more items of multi-modal data with respect to at least one of the plurality of dimensions comprises determining a physical distance between each of the two or more items of multi-modal data.

11. The method of claim 1, wherein said determining an overlap of the window of relevance corresponding to each of the two or more items of multi-modal data with respect to at least one of the plurality of dimensions comprises determining a syntactic distance between each of the two or more items of multi-modal data.

12. The method of claim 11, wherein said determining the syntactic distance comprises measuring the syntactic distance via an edit distance measure, a phonetic distance measure, a pre-fix matching measure, and/or an abbreviation expansion measure.

13. The method of claim 1, wherein said determining an overlap of the window of relevance corresponding to each of the two or more items of multi-modal data with respect to at least one of the plurality of dimensions comprises determining a semantic distance between each of the two or more items of multi-modal data.

14. The method of claim 13, wherein said determining the semantic distance comprises measuring the semantic distance based a relatedness of words contained and/or derived from the two or more items of multi-modal data.

15. The method of claim 1, comprising:
storing the identification of the two or more of the multiple items of multi-modal data as related with respect to at least one of the plurality of dimensions.

16. An article of manufacture comprising a non-transitory computer readable storage medium having computer readable instructions tangibly embodied thereon which, when implemented, cause a computer to carry out a plurality of method steps comprising:
collecting multiple items of multi-modal data comprising a plurality of dimensions from multiple data stream originators, wherein said plurality of dimensions comprises at least a geographic dimension, a temporal dimension and an event-related dimension;
annotating each of the multiple items of collected multi-modal data with information, wherein the information comprises at least a veracity score associated with the data stream originator of the item of data;
determining multiple windows of relevance for the multiple items of multi-modal data with respect to the plurality of dimensions, wherein said multiple windows of relevance comprise at least (i) a temporal window of relevance, (ii) a spatial window of relevance, and (iii) and a semantic window of relevance; and
identifying two or more of the multiple items of multi-modal data as related based on said veracity score associated with the data stream originator of each item of data and by determining an overlap of at least one of the multiple windows of relevance corresponding to each of the two or more items of multi-modal data with respect to at least one of the plurality of dimensions.

17. A system comprising:
a memory; and
at least one processor coupled to the memory and configured for:
collecting multiple items of multi-modal data comprising a plurality of dimensions from multiple data stream originators, wherein said plurality of dimensions comprises at least a geographic dimension, a temporal dimension and an event-related dimension;
annotating each of the multiple items of collected multi-modal data with information, wherein the information comprises at least a veracity score associated with the data stream originator of the item of data;
determining multiple windows of relevance for the multiple items of multi-modal data with respect to the plurality of dimensions, wherein said multiple windows of relevance comprise at least (i) a temporal window of relevance, (ii) a spatial window of relevance, and (iii) and a semantic window of relevance; and
identifying two or more of the multiple items of multi-modal data as related based on said veracity score associated with the data stream originator of each item of data and by determining an overlap of at least one of the multiple windows of relevance corresponding to each of the two or more items of multi-modal data with respect to at least one of the plurality of dimensions.

18. The system of claim 17, wherein said multi-modal data comprises text message data, speech data, global positioning system data, audio data, mobile call detail records, internet content, and/or mobile-specific content.

19. A method comprising:
collecting multiple items of multi-modal data comprising multiple dimensions from multiple data stream originators, wherein said multiple dimensions comprise a geographic dimension, a temporal dimension and an event-related dimension;
annotating each of the multiple items of collected multi-modal data with information, wherein the information comprises at least a veracity score associated with the data stream originator of the item of data;
determining multiple windows of relevance for the multiple items of multi-modal data with respect to each of the multiple dimensions, wherein said multiple windows of relevance comprise at least (i) a temporal window of relevance, (ii) a spatial window of relevance, and (iii) and a semantic window of relevance;
identifying two or more of the multiple items of multi-modal data as related based on said veracity score associated with the data stream originator of each item of data and by determining an overlap of at least one of the multiple windows of relevance corresponding to each of the two or more items of multi-modal data with respect to at least two of the multiple dimensions; and
generating an alert based on the content of the two or more related items of multi-modal data;

wherein said collecting, said annotating, said determining, said identifying, and said generating are carried out by a computer device.

* * * * *